United States Patent
Saurav et al.

(10) Patent No.: US 10,331,947 B2
(45) Date of Patent: Jun. 25, 2019

(54) AUTOMATIC DETECTION ON STRING AND COLUMN DELIMITERS IN TABULAR DATA FILES

(71) Applicant: International Business Machines Corporation, Armonk, NY (US)

(72) Inventors: Shitesh Saurav, Los Angeles, CA (US); Peter Schwarz, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 15/497,912

(22) Filed: Apr. 26, 2017

(65) Prior Publication Data

US 2018/0314883 A1 Nov. 1, 2018

(51) Int. Cl.
| | |
|---|---|
| *G06F 17/27* | (2006.01) |
| *G06K 9/00* | (2006.01) |
| *G06K 9/62* | (2006.01) |
| *G06F 17/24* | (2006.01) |

(52) U.S. Cl.
CPC ....... *G06K 9/00456* (2013.01); *G06F 17/245* (2013.01); *G06F 17/277* (2013.01); *G06K 9/00449* (2013.01); *G06K 9/6267* (2013.01)

(58) Field of Classification Search
CPC .... G06F 16/221; G06F 16/245; G06F 17/245; G06F 17/277
See application file for complete search history.

(56) References Cited

U.S. PATENT DOCUMENTS

| | | | | |
|---|---|---|---|---|
| 3,646,523 | A | 2/1972 | Berkling | |
| 6,016,497 | A * | 1/2000 | Suver | G06F 16/284 |
| 6,553,383 | B1 * | 4/2003 | Martin | G06F 16/284 |
| | | | | 707/792 |
| 7,685,107 | B2 * | 3/2010 | Smith | G06F 16/245 |
| | | | | 707/758 |
| 8,639,673 | B2 * | 1/2014 | Amit | G06F 3/0608 |
| | | | | 707/693 |
| 9,043,293 | B2 * | 5/2015 | Amit | H03M 7/30 |
| | | | | 707/693 |
| 2010/0005113 | A1 * | 1/2010 | Hu | G06F 16/24553 |
| | | | | 707/E17.005 |

(Continued)

OTHER PUBLICATIONS ip.com, Enhanced Data File Compression Method for Data Movement, Jul. 30, 2013.*

(Continued)

*Primary Examiner* — Giovanna B Colan
(74) *Attorney, Agent, or Firm* — Ryan, Mason & Lewis, LLP

(57) ABSTRACT

Methods, systems, and computer program products for automatic detection of string and column delimiters in tabular data files are provided herein. A computer-implemented method includes detecting (i) candidate column delimiters in a file containing tabular data and (ii) candidate string delimiters in the file containing tabular data; evaluating the likelihood of validity of each possible candidate column delimiter-candidate string delimiter pairing among the detected candidate column delimiters and the detected candidate string delimiters; and outputting, to at least one user, the candidate column delimiter-candidate string delimiter pairing having the highest likelihood of validity.

20 Claims, 5 Drawing Sheets

(56) References Cited

U.S. PATENT DOCUMENTS

| | | | | |
|---|---|---|---|---|
| 2015/0106409 A1* | 4/2015 | Yamamoto | ............ | G06F 16/162 |
| | | | | 707/821 |
| 2016/0092557 A1* | 3/2016 | Stojanovic | ............ | G06Q 30/02 |
| | | | | 707/723 |
| 2018/0113890 A1* | 4/2018 | Raza | ..................... | G06F 16/213 |
| 2018/0113894 A1* | 4/2018 | Raza | ..................... | G06F 16/221 |

OTHER PUBLICATIONS ip.com, High Efficient Tool for Extracting Tabular Data from XML File, Mar. 29, 2014.

ip.com, IBM, Consolidated Graphical Interface for Tabular Data, Aug. 4, 2004.

F. Pedregosa, et al. "SciKit-Learn: Machine Learning in Python," Journal of Machine Learning Research, vol. 12, pp. 2825-2830. 2011.

IBM, "LOAD Command," DB2 for Linux Unix and Windows, version 11.1.0, http://www.ibm.com/support/knowledgecenter/SSEPGG_11.1.0/com.ibm.db2.luw.admin.cmd.dock/Doc/r0008305.html, Dec. 2016.

Oracle, "SQL* Loader Control File Reference," Oracle 9i Database Urtilities Release 2, https://docs.oracle.com/cd/B10500_01/server.920/a96652/ch05.htm, Sep. 2015.

M. Casters. "Figuring out the layout of a delimited file" in Matt Casters on Data Integration, http://www.ibridge.be/?o=273, Sep. 2013.

JosipK, "Auto-detect CSV separator," http://www.codeproject.com/Articles/231582/Auto-detect-CSV-separator, Jul. 2011.

E. Ouelette, "How to programmatically guess whether a CSV tile is comma or semicolon delimited," http://stackoverflow.com/questions/2789695/how-to-programmatically-guess-whether-a-csv-file-is-comma-or-semicolon-delimited, Jan. 2014.

Pietzcker, T. "How should I detect which delimiter is used in a text file?" http://stackoverflow.com/questions/761932/how-should-i-detect-which-delimiter-is-used-in-a-text-file, Apr. 2009.

Python, "14.1 csv—CSV file reading and writing", The Python Standard Library version 3.5.2, Python Software Foundation, https://docs.python.org/3/library/csv.html, Jul. 2016.

* cited by examiner

AUTOMATIC DETECTION ON STRING AND COLUMN DELIMITERS IN TABULAR DATA FILES

FIELD

The present application generally relates to information technology, and, more particularly, to tabular data management.

BACKGROUND

Before a data scientist can begin to analyze a dataset or integrate a dataset with other data, a significant amount of time is typically spent on data wrangling, a process that includes ingestion, cleansing and transformation of data. Additionally, as analytics-as-a-service offerings become more common, automation of the data wrangling process would potentially contribute significantly to overall efficiency of data management and/or data analysis tasks.

SUMMARY

In one embodiment of the present invention, techniques for automatic detection of string and column delimiters in tabular data files are provided. An exemplary computer-implemented method can include detecting (i) one or more candidate column delimiters in a file containing tabular data and (ii) one or more candidate string delimiters in the file containing tabular data, wherein a column delimiter comprises a character that separates a first column in a table from a second column in the table, and wherein a string delimiter comprises a character that denotes alphabetical text in the file. Such a method can also include evaluating the likelihood of validity of each possible candidate column delimiter-candidate string delimiter pairing among the detected candidate column delimiters and the detected candidate string delimiters, wherein such evaluating comprises applying a logistic-regression classifier to each of the possible candidate column delimiter-candidate string delimiter pairings. Further, such a method can also include outputting, to at least one user, the candidate column delimiter-candidate string delimiter pairing having the highest likelihood of validity.

In another embodiment of the invention, an exemplary computer-implemented method can include determining how many times each of multiple non-alphanumeric characters appears on each line in at least a portion of a file containing tabular data, and selecting, based on the determining step, (i) one or more candidate column delimiters in the at least a portion of the file and (ii) one or more candidate string delimiters in the at least a portion of the file.

In yet another embodiment of the invention, an exemplary computer-implemented method can include scanning a file to compute a frequency map of any non-alphanumeric characters in the file, denoting how many times each of the non-alphanumeric characters appears on each line in the file. Such a method can also include selecting, as string delimiter candidates, those non-alphanumeric characters that appear an even number of times on a given line, wherein a null character is appended to a list of the string delimiter candidates, and wherein the null character represents a case wherein no character is used as a string delimiter. Also, for each of the string delimiter candidates, such a method can include (i) re-scanning the file and re-computing the frequency map, ignoring any characters that are enclosed by the string delimiter candidate, wherein if the length of a given line is greater than a specified limit, starting a new line; and (ii) selecting, as column delimiter candidates, those characters that appear the same number of times on a number of lines that exceeds a predetermined threshold. Further, such a method can additionally include scanning the file for each of the string delimiter candidates, to: (a) determine a hypothetical number of columns in the file by parsing a selected line from the file using a current delimiter candidate pair; (b) parse all lines in the file using the current delimiter candidate pair, and computing one or more feature values that indicate that the file has been parsed correctly; (c) if in a training phase, write the one or more feature values to a training file, and, if the current delimiter candidate pair is the correct delimiter pair, write "1" to the training file, else write "0"; and (d) if in the scoring phase, score the one or more feature values for the current delimiter candidate pair using a logistic regression model created in the training phase. If in the training phase, such a method can also include computing one or more coefficients for the logistic regression model using the training file, and, if in the scoring phase, outputting the candidate delimiter pair with the highest score as the most likely delimiter pair.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
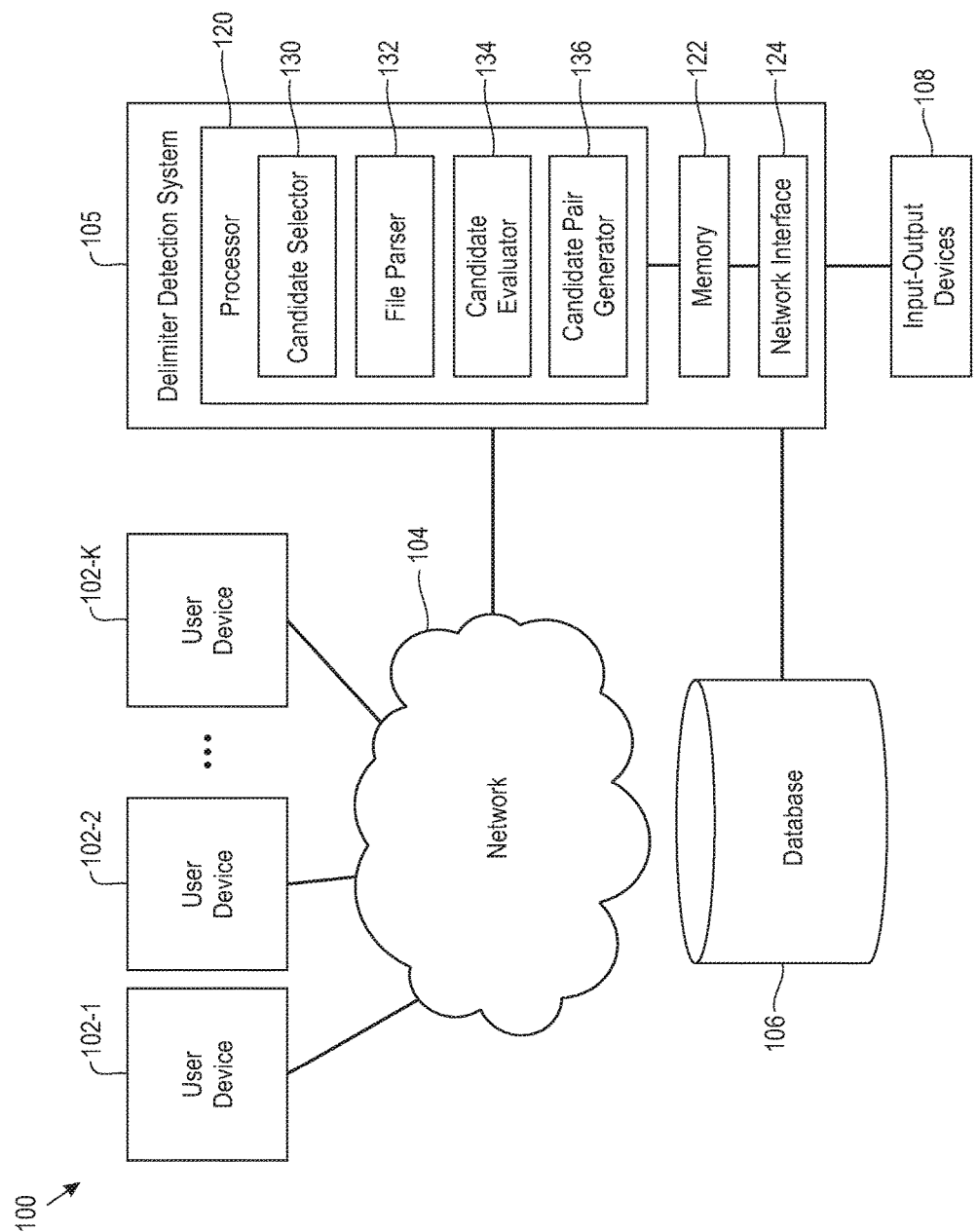
FIG. 1 is a block diagram of a computer network configured for delimiter detection in an illustrative embodiment of the invention.

As described herein, an embodiment of the present invention includes automatic detection of string and column delimiters in tabular data files. As detailed herein, tables are a common way to represent data, and data are produced and/or consumed in tabular form by many widely-used applications, including spreadsheets and relational databases. Because such systems can commonly have proprietary internal representations for tabular data, such data are often exchanged between systems (and organizations) in the form of a standard representation such as American Standard Code for Information Interchange (ASCII) files, also referred to as delimited text files. In such files, a character, referred to as the column delimiter, is used to separate one table column from another. Because the data in a column may contain the column delimiter character, or be broken across multiple lines, a second character, the string delimiter, is typically used in pairs to enclose columns containing ordinary text (as opposed to numbers, currency, dates, etc.). String delimiters are used in pairs because the string delimiters mark the beginning and end of a string. The same string delimiter character (such as, for example, double quotation marks), can be assumed to be used throughout a given file. Also, the same column delimiter character (such as, for example, a comma) can also be assumed to be used throughout a given file.

A commonly-used column delimiter is the comma, with single or double quotes commonly being used as a string delimiter. Files that use this representation are commonly referred to as comma-separated-value (CSV) files. However, a significant fraction of tabular data files, including many on open-data websites, use other delimiters. Thus, identifying the delimiter(s) used in a tabular data file becomes an important step in the data wrangling process.

Accordingly, at least one embodiment of the invention includes detecting string and column delimiters as part of an automated ingestion of files containing tabular data. Such an embodiment can include using a logistic-regression classifier to evaluate whether a particular choice of delimiters is correct. Further, in one or more embodiments of the invention, the delimiter choice that is given the highest score by the classifier can then be chosen as the delimiter most likely to be correct.

As further described herein, at least one embodiment of the invention can include scanning a file (or a portion of a file) to compute a frequency map of non-alphanumerics in the file, denoting how many times each non-alphanumeric character appears on each line in the file (or file portion). Such an embodiment can additionally include selecting, as string delimiter candidates, those non-alphanumeric characters that appear the most often, an even number of times, on a given line. Further, the NULL character can be appended to the list of string delimiter candidates to represent the case wherein no character is used as a string delimiter. The string delimiter commonly occurs an even number of times because, for each string in a row, one instance of the delimiter is used to mark the beginning of the string and another instance is used to mark the end of the string. Any character that is not paired this way is less likely to be the string delimiter.

By way merely of example, consider the following: "Schwarz", "Peter M.", "Pete's Fine Meat Co." The double-quotation marks occur an even number of times (6), as does the period (2). However, the comma occurs an odd number of times (3). Thus, the double-quotation marks and the period are better candidates for the string delimiter than is the comma.

Also, for each string delimiter candidate, at least one embodiment of the invention can include re-scanning the file (or the portion of the file) and re-computing the frequency map, ignoring any characters (including any character indicating end-of-line) that appear to be enclosed by the string delimiter candidate. Text is "enclosed" by the string delimiter if there is an occurrence of the delimiter before the text and after the text. For instance, in the above example of "Schwarz", "Peter M.", "Pete's Fine Meat Co.", when the string delimiter candidate is the double-quotation marks, the period within the text "Peter M." would not be counted in the revised frequency map. Likewise, the apostrophe and the period in the text "Pete's Fine Meat Co." would not be counted. However, when the string delimiter candidate is the period, the double quotation marks, the apostrophe, and the comma in the text between periods (.","  Pete's Fine Meat Co.) would not be included in the revised frequency map.

In such an embodiment, if the length of a given line appears to be greater than a specified limit (for example, longer than five times the length of the average line seen up to that point), a new line can be started. A line break commonly indicates the end of one row of columns and the start of another row of columns. However, sometimes, a significant amount of text can occur within a single column, making it impractical to place all of the column (and all other columns of the row) on a single line. This can be carried out, for example, by ignoring line breaks when such line breaks occur within a pair of string delimiters. In one or more embodiments of the invention, if no matching delimiter has been found and the length of the line being processed is above a pre-determined threshold (for example, 5 times the average length of lines processed previously), the search for a matching delimiter is ended. When this occurs, such an embodiment includes beginning scanning of a new row of the file at the next line break, even if no closing string delimiter for the previous value was found.

Also, based upon the re-scanning and re-computing of the frequency map, one or more embodiments can include selecting, as column delimiter candidates, those characters that appear the same number of times on the greatest number of lines. With regard to characters appearing the same number of times, the number of columns in a row is typically (although not always) the same for every row. This means that, in many instances, every row should contain the same number of column delimiters (excluding those within string delimiters, as noted herein).

Additionally, at least one embodiment of the invention can include scanning the file (or the portion of the file) for each identified and/or selected string delimiter candidate. Such scanning can be carried out to determine the hypothetical number of columns in the file (or file portion) by parsing a selected line from the file (or file portion) using the current delimiter candidate pair. Additionally, such scanning can be carried out to parse all lines in the file (or the portion of the file) using the current delimiter candidate pair and compute feature values that indicate that the file has been parsed correctly (such as further described herein in connection with Table 2).

As noted above, a string and column delimiter candidate pair can be used to divide a file into rows and columns using a set of rules (such as detailed herein). That is, the text between a pair of string delimiters is assumed to be the content of a column, as is undelimited text between occurrences of the column delimiter (or the column delimiter and a line break). Note that if the delimiter pair under evaluation is incorrect, various anomalies will occur, such as over-long lines, lines with an incorrect number of columns (that is, a number that is different from the number of columns on lines processed previously), etc. The frequency of such anomalies is taken into account by making these frequencies features in the linear regression algorithm of one or more embodiments of the invention. In such an embodiment, if a candidate set of delimiters is marked as an incorrect choice in the training data, then the values of these features become evidence against the correctness of a candidate choice in the linear regression model. Conversely, if the delimiters are the correct ones, the values of the features become evidence in favor of the candidate choice.

During a training phase (wherein a logistic regression model is being created), at least one embodiment of the invention can include writing the feature values to a training file. Additionally, if the current candidate delimiters are the correct delimiters, such an embodiment can include writing "1" to the training file; otherwise, such an embodiment can include writing "0" to the training file. A training file can contain, for example, one row for each combination of (i) a sample data file and (ii) a candidate delimiter pair. Each such row contains one column for each feature used by the linear regression model (see, for example, Table 2 below), with that column containing the value of that feature for the current sample file and delimiter pair. One additional column can record whether the delimiter pair is the correct one for the sample file ("1") or not ("0"). This information for each sample file must be known a priori. Once the model is trained, a file for which the correct delimiters are unknown can be parsed with various candidate delimiters, and the linear regression algorithm will provide a score between 0 and 1 for each candidate pair that represents the probability that that pair of delimiters is the correct one.

Also, during the training phase, one or more embodiments of the invention can include computing coefficients for a logistic regression model using the training files. Further, during a (subsequent) scoring phase, such an embodiment can include outputting the candidate delimiter pair with the highest score as the most likely delimiter pair.

In one or more embodiments of the invention, one or more of the above-noted steps can be carried out and/or processed in a single scan of the file per (candidate) string delimiter.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a delimiter detection system 105.

The user devices 102 may comprise, for example, mobile telephones, laptop computers, tablet computers, desktop computers or other types of devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The delimiter detection system 105 has an associated database 106 configured to store data characterizing string and column delimiters for a plurality of distinct tabular data files. In one or more embodiments of the invention, the database 106, which can store tabular files with known delimiters, is only needed during the training of the model. Thereafter, only a determined set of feature weights needs to be retained for use when processing new files wherein the delimiters are unknown.

The database 106 in the present embodiment is implemented using one or more storage systems associated with the delimiter detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the delimiter detection system 105 are input-output devices 108, which illustratively comprise keyboards, displays or other types of input-output devices in any combination. Such input-output devices are used to support one or more user interfaces to the delimiter detection system 105, as well as to support communication between the delimiter detection system 105 and other related systems and devices not explicitly shown.

The delimiter detection system 105 in the FIG. 1 embodiment is assumed to be implemented using at least one processing device. Each such processing device generally comprises at least one processor and an associated memory, and implements one or more functional modules for controlling certain features of the delimiter detection system 105.

More particularly, the delimiter detection system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the delimiter detection system 105 to communicate over the network 104 with the user devices 102, and illustratively comprises one or more conventional transceivers.

The processor 120 further comprises a candidate selector 130, a file parser 132, a candidate evaluator 134 and a candidate pair generator 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the candidate selector 130, file parser 132, candidate evaluator 134 and candidate pair generator 136 may be implemented at least in part in the form of software that is stored in memory 122 and executed by processor 120.

It is to be understood that the particular set of elements shown in FIG. 1 for automatically detecting string and column delimiters involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the delimiter detection system 105 can be eliminated and associated elements such as candidate selector 130, file parser 132, candidate evaluator 134 and candidate pair generator 136 can be implemented elsewhere in the computer network 100.

An exemplary process utilizing candidate selector 130, file parser 132, candidate evaluator 134 and candidate pair generator 136 of the delimiter detection system 105 in computer network 100 will be described in more detail below as well as with reference to the flow diagram of FIG. 2.

The candidate selector 130 uses one or more heuristics to select candidate string and column delimiter pairs. Additionally, as detailed herein, the file parser 132 parses (or partitions) the tabular data file in question using each selected candidate pair. The purpose of parsing the file is to determine values for the features (such as for example, those seen in Table 2), which are then used to train the linear regression model (during training on files with known delimiters), or to score a candidate delimiter pair (when the system is deployed and applied to files with unknown delimiters). A goal during training includes teaching the model what both the output of a "good" parse (one done with correct delimiters) and a "bad" parse (one done with incorrect delimiters) look like, in terms of the features. When the system is deployed and run on an unknown file, a purpose can include determining which of the generated candidate pairs produces a parse that looks the "best" in terms of the features.

Further, the candidate evaluator 134 uses a logistic-regression classifier to evaluate whether or not each selected candidate pair is correct, and the candidate pair generator 136 identifies the candidate pair with the highest score as the one most likely to be the correct choice, and outputs that candidate pair to one or more user devices 102 and/or one or more input-output devices 108.

For both column delimiters and string delimiters, the candidate selector 120 can consider any character other than a letter or number as a potential delimiter. For each such character c in the tabular data file, the candidate selector 120 can compute a frequency map that shows the number of lines on which the character c occurred n times, for all observed values of n. Because text enclosed within a pair of string delimiters can be ignored when trying to discover a column delimiter, at least one embodiment of the invention can include selecting string delimiter candidates first, and then evaluating column delimiter candidates within the context of a specific string delimiter.

As noted above, the candidate selector 120 uses one or more heuristics to select candidate string and column delimiter pairs. An example heuristic used for selecting string delimiter candidates can include the number of lines on which the candidate character appears an even number of times, from which it can be inferred that the candidate character might be being used to enclose quoted text. If, according to the frequency map, the number of such lines is greater than a minimum fraction of the number of lines in the file (or sample), that character is included as a string delimiter candidate.

In such an embodiment, for each string delimiter candidate, an additional heuristic can be used to select column delimiter candidates. Such a heuristic includes re-computing the frequency maps, ignoring all characters that appear between occurrences of the current string delimiter. From the revised frequency maps, one or more embodiments of the invention can include selecting, as possible column delimiters, those characters that appear the same number of times on the largest number of lines. For example, given the frequency map fragments in Table 1 below, comma and semicolon would be selected as column delimiter candidates because they occur the same number of times (6 and 5, respectively) on the largest number of lines (30).

TABLE 1

Sample Frequency Map Fragments

| Character "c" | Frequency "n" | Number of Lines |
|---|---|---|
| , | 6 | 30 |
|   | 7 | 2 |
|   | ... |   |
| ; | 5 | 30 |
|   | 7 | 3 |
|   | ... |   |
| / | 12 | 9 |
|   | 7 | 23 |

In one or more embodiments of the invention, once candidate delimiter pairs are selected (via component 130, for example), a feature vector can be constructed for each pair, wherein such a feature vector can subsequently be used by the candidate evaluator 134. Each feature vector is determined by parsing the tabular data file (carried out via file parser 132, for example) with the candidate delimiters and calculating values for one or more features. By way of example, one or more embodiments of the invention can utilize the features listed in Table 2 below.

TABLE 2

Features Used by the Candidate Evaluator

| Feature | Description |
| --- | --- |
| NPaired | Number of lines on which the string delimiter appears in matched pairs. |
| PairFrac | Fraction of lines in the file on which the string delimiter appears in matched pairs. |
| NFields | The number of columns in the parsed file. |
| NBadLines | The number of lines that do not contain NFields columns. |
| NRogueChars | The number of lines on which characters appear within a column, but outside of a string delimiter pair. |
| PeqL | 1 if the number of physical lines is equal to the number of logical lines; 0 otherwise. |
| NPunted | Number of lines that are too long (over 50,000 characters, for example). |
| EmptyFrac | The fraction of columns in a line that are empty, averaged over all of the lines in the file. |

To train the candidate evaluator 134 (also referred to herein as the classifier), at least one embodiment of the invention utilizes a collection of tabular data files divided into two groups. Commonly, many tabular data files use double quotes and commas as delimiters. Therefore, the first group of training files includes files that employ these standard delimiters. The second group of training files includes files that have been modified to employ a delimiter pair randomly selected from all possible combinations of non-alphabetic, non-numeric characters found in the file. One or more embodiments of the invention can also include modifying a given percentage (for example, approximately ten percent) of the files in both groups, such as by deleting one or more columns of data from one or more rows.

Tools (such as, for example, SciKit-Learn), can be used to train a logistic-regression classifier to recognize, using features such as described above, whether a particular set of delimiters is correct. Each training file can provide both positive and negative examples. To provide positive examples, at least one embodiment of the invention can include computing feature vectors for the training files using the correct delimiters. To provide negative examples, at least one embodiment of the invention can include re-computing the feature vectors with all possible incorrect delimiter pairs. Further, to prevent over-fitting, one or more embodiments of the invention can include performing 20-fold cross-validation on the training set.

Once the candidate evaluator 134 (classifier) has been trained, it can be used in one or more embodiments of the invention to analyze tabular data files for which the delimiters are unknown. By way of example, the output of the classifier can include a value between 0 and 1 that represents the probability that a candidate delimiter pair is correct (with 0 being very likely incorrect and 1 being very likely correct). As described herein, the candidate pair generator 136 implements an algorithm to choose the pair (among multiple candidate pairs) with the highest score as the most likely delimiters for the file. The algorithm (also referred to herein as the linear regression algorithm) computes the score for a pair based on the features from the parse. Once the scores are generated, the highest score is selected.

By applying machine learning to issues pertaining to automating the data wrangling process, the techniques detailed herein create a robust solution that can work with arbitrary character sets and delimiter choices, and is tolerant of noisy data containing incorrectly formatted lines.

Figure 2:
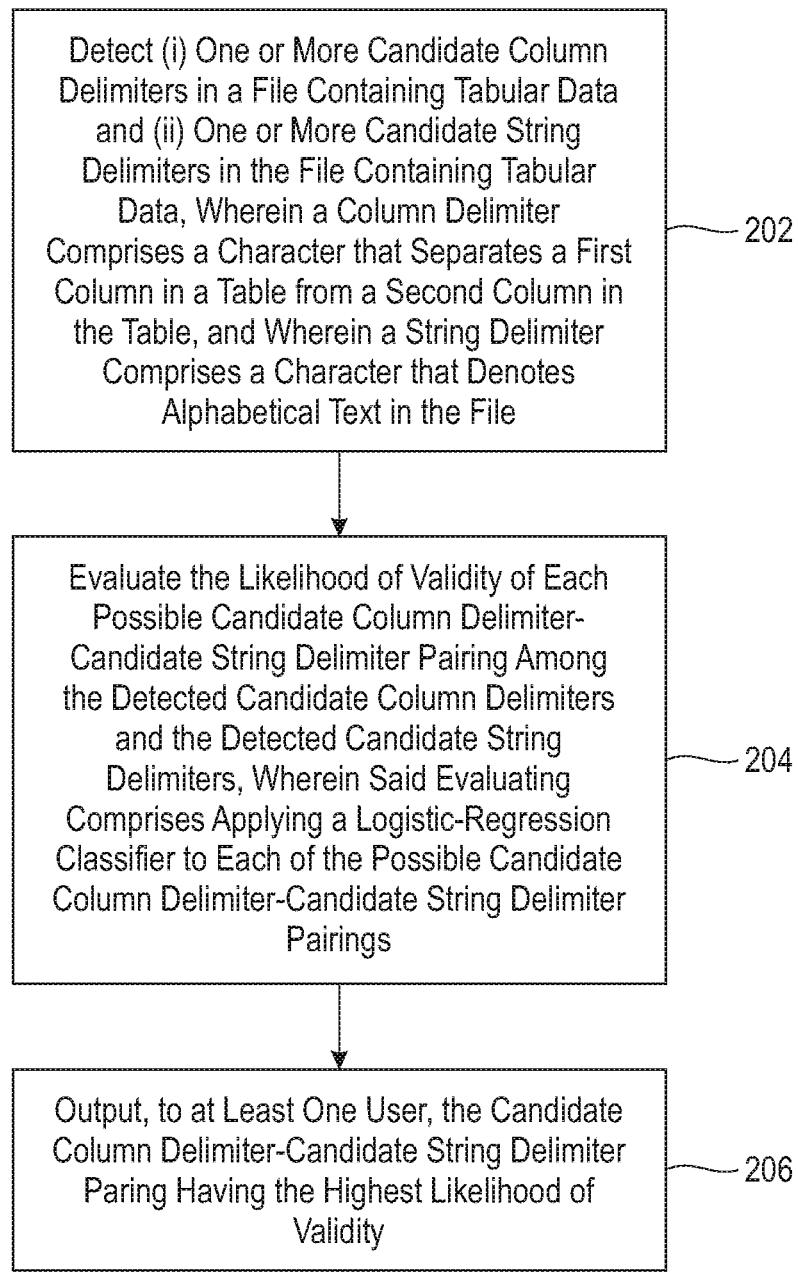
FIG. 2 is a flow diagram illustrating techniques according to an embodiment of the invention.

FIG. 2 is a flow diagram illustrating techniques according to an embodiment of the present invention. Step 202 includes detecting (i) one or more candidate column delimiters in a file containing tabular data and (ii) one or more candidate string delimiters in the file containing tabular data, wherein a column delimiter comprises a character that separates a first column in a table from a second column in the table, and wherein a string delimiter comprises a character that denotes alphabetical text in the file. Detecting can include computing a frequency map of multiple non-alphanumeric characters in the file, wherein computing can include denoting how many times each of the non-alphanumeric characters appears on each line in the file.

Additionally, detecting one or more candidate string delimiters in the file can include selecting the one or more non-alphanumeric characters that appear the most often, an even number of times, on a given line in the file. Also, for each detected candidate string delimiter, at least one embodiment of the invention can include re-computing the frequency map of the multiple non-alphanumeric characters in the file, ignoring any non-alphanumeric characters that are enclosed by the string delimiter candidate. Further, detecting one or more candidate column delimiters can include selecting, based on the re-computed frequency map, the one or more non-alphanumeric characters that appear the same number of times on the greatest number of lines.

Step 204 includes evaluating the likelihood of validity of each possible candidate column delimiter-candidate string delimiter pairing among the detected candidate column delimiters and the detected candidate string delimiters, wherein said evaluating comprises applying a logistic-regression classifier to each of the possible candidate column delimiter-candidate string delimiter pairings. Evaluating can include constructing one or more feature vectors corresponding to the detected candidate column delimiters and the detected candidate string delimiters, wherein constructing the one or more feature vectors can include parsing the file using the detected candidate column delimiters and the detected candidate string delimiters.

Such feature vectors can include the number of lines in the file in which a candidate string delimiter appears in matched pairs, the fraction of lines in the file in which a candidate string delimiter appears in matched pairs, the number of columns in the parsed file, the number of lines in the file in which one or more characters appear within a column but outside of a candidate string delimiter pair, and/or the number of lines in the file that are longer than a predetermined threshold length. Additionally, such feature vectors can also include the number of lines on which one or more characters appear within a column, but outside of a string delimiter pair, and the fraction of columns in a line that are empty, averaged over all lines in the file. Further, yet another such feature vector can include (i) a first indication if the number of physical lines is equal to the number of logical lines, and (ii) a second indication if the number of physical lines is not equal to the number of logical lines.

Step 206 includes outputting, to at least one user, the candidate column delimiter-candidate string delimiter pairing having the highest likelihood of validity.

Also, an additional embodiment of the invention includes determining how many times each of multiple non-alphanumeric characters appears on each line in at least a portion of a file containing tabular data, and selecting, based on the determining step, (i) one or more candidate column delimiters in the at least a portion of the file and (ii) one or more candidate string delimiters in the at least a portion of the file, wherein a column delimiter comprises a character that separates a first table from a second table, and wherein a string delimiter comprises a character that denotes alphabetical text.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives tabular data files sent from a data source to the transmission server. The server can process the information, for example, based upon user-provided user preference information that is stored in memory on the server. Subsequently, an alert is generated containing one or more identified string delimiter and column delimiter pairs pertaining to the tabular data files. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Additionally, an embodiment of the present invention can make use of software running on a computer or workstation.

Figure 3:
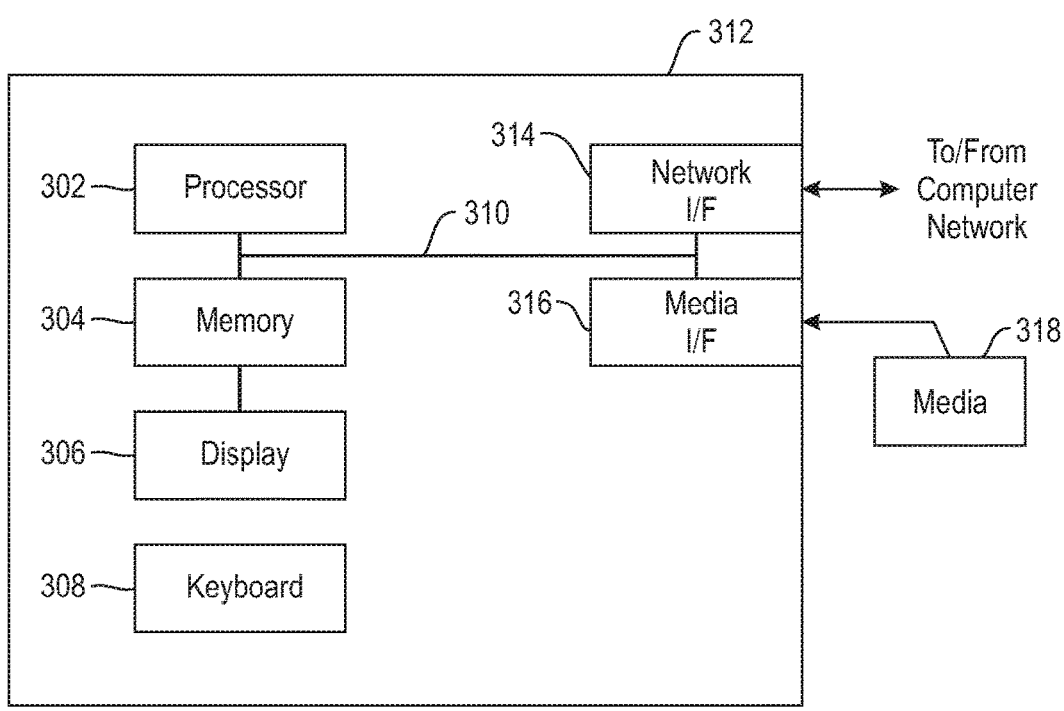
FIG. 3 is a system diagram of an exemplary computer system on which at least one embodiment of the invention can be implemented.

With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
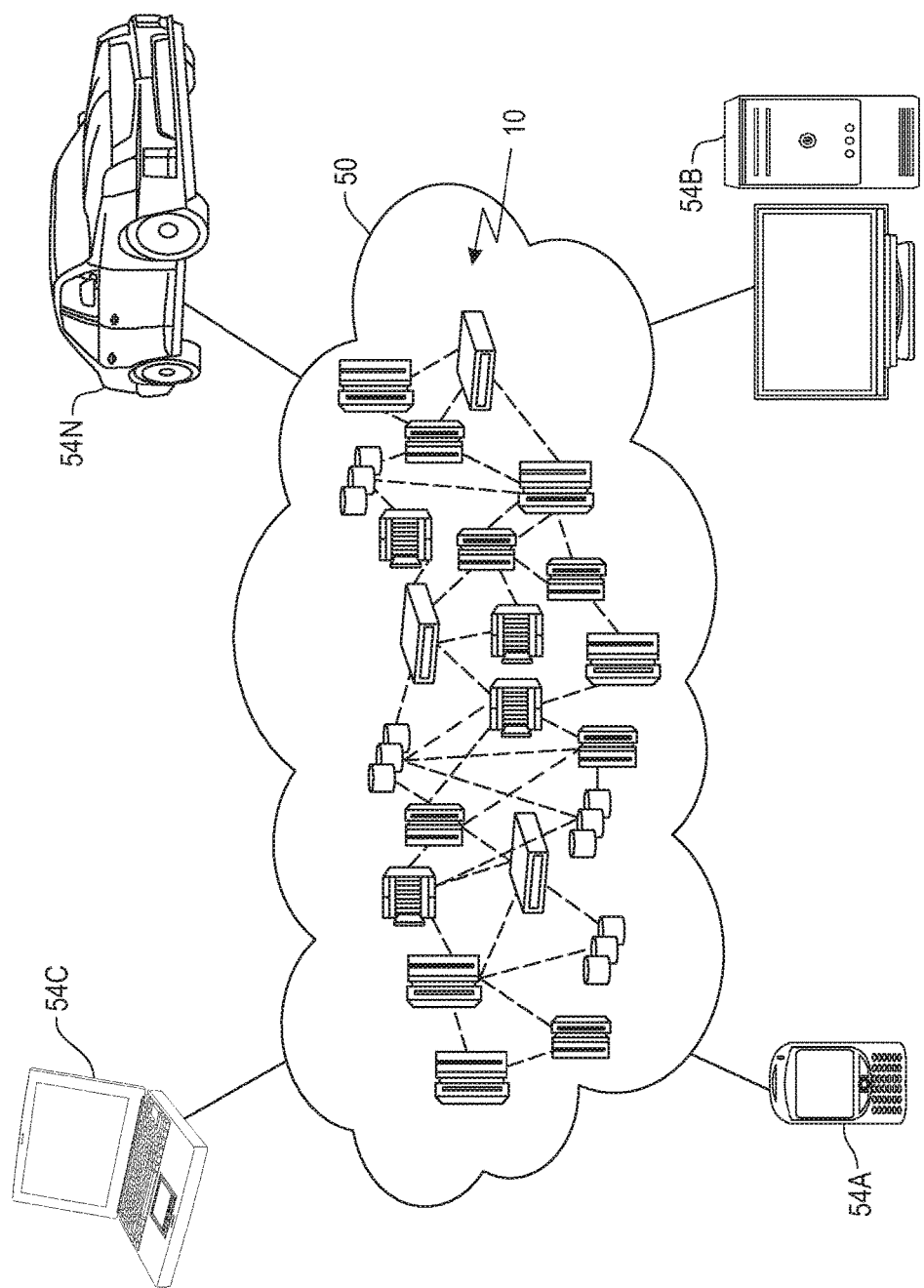
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
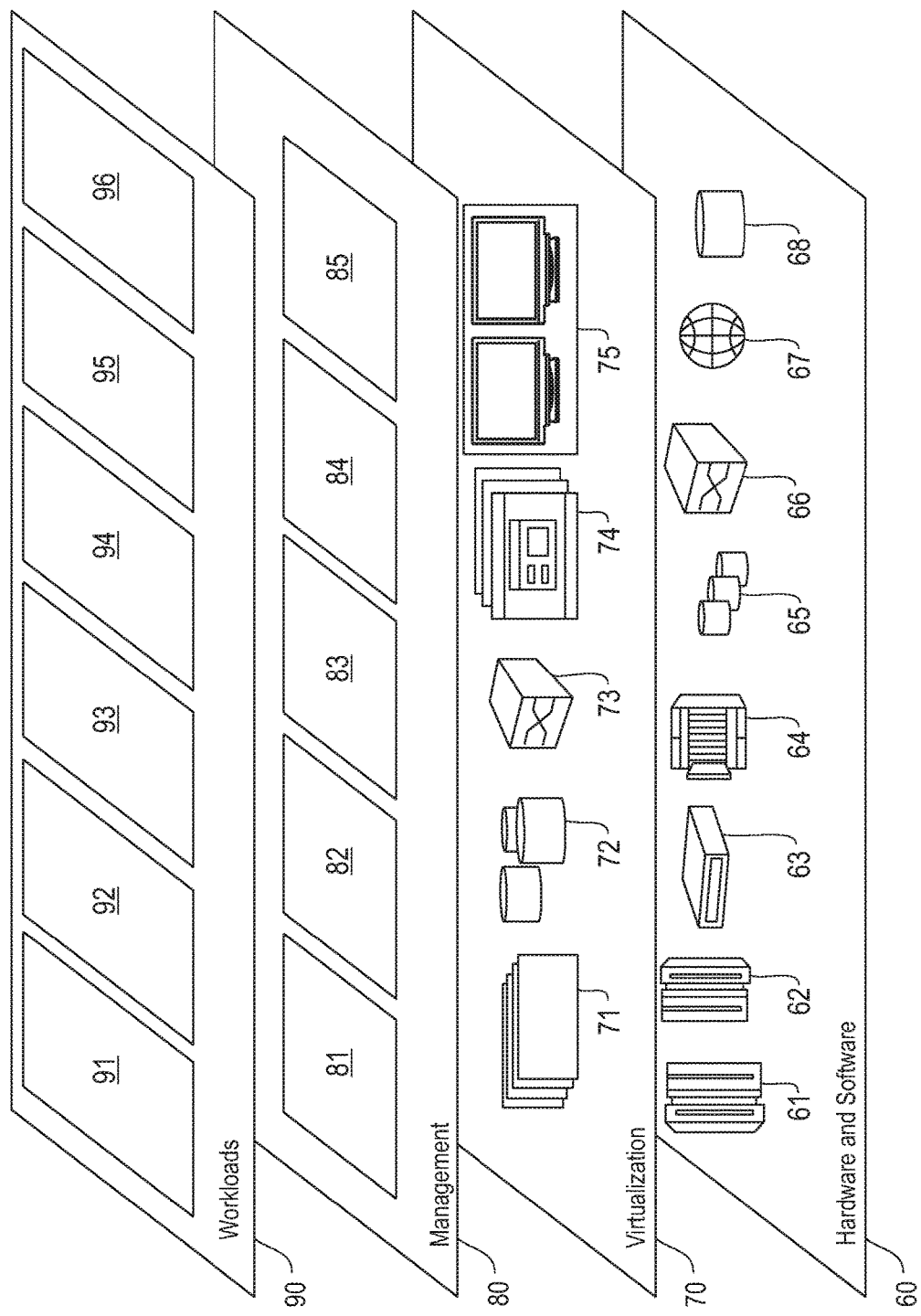
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and string and column delimiter detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, detecting string and column delimiters as part of an automated ingestion of files containing tabular data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting (i) one or more candidate column delimiters in a file containing tabular data and (ii) one or more candidate string delimiters in the file containing tabular data, wherein a column delimiter comprises a character that separates a first column in a table from a second column in the table, and wherein a string delimiter comprises a character that denotes alphabetical text in the file;
   evaluating the likelihood of validity of each possible candidate column delimiter-candidate string delimiter pairing among the detected candidate column delimiters and the detected candidate string delimiters, wherein said evaluating comprises applying a logistic-regression classifier to each of the possible candidate column delimiter-candidate string delimiter pairings; and
   outputting, to at least one user, the candidate column delimiter-candidate string delimiter pairing having the highest likelihood of validity;
   wherein the steps are carried out by at least one computing device.

2. The computer-implemented method of claim 1, wherein said detecting comprises computing a frequency map of multiple non-alphanumeric characters in the file.

3. The computer-implemented method of claim 2, wherein said computing comprises denoting how many times each of the non-alphanumeric characters appears on each line in the file.

4. The computer-implemented method of claim 2, wherein said detecting one or more candidate string delimiters in the file comprises selecting the one or more non-alphanumeric characters that appear the most often, an even number of times, on a given line in the file.

5. The computer-implemented method of claim 2, comprising:
   for each detected candidate string delimiter, re-computing the frequency map of the multiple non-alphanumeric characters in the file, ignoring any non-alphanumeric characters that are enclosed by the string delimiter candidate.

6. The computer-implemented method of claim 5, wherein said detecting one or more candidate column delimiters comprises selecting, based on the re-computed frequency map, the one or more non-alphanumeric characters that appear the same number of times on the greatest number of lines.

7. The computer-implemented method of claim 1, wherein said evaluating comprises constructing one or more feature vectors corresponding to the detected candidate column delimiters and the detected candidate string delimiters.

8. The computer-implemented method of claim 7, wherein said constructing the one or more feature vectors comprises parsing the file using the detected candidate column delimiters and the detected candidate string delimiters.

9. The computer-implemented method of claim 7, wherein the feature vectors comprise the number of lines in the file in which a candidate string delimiter appears in matched pairs.

10. The computer-implemented method of claim 7, wherein the feature vectors comprise the fraction of lines in the file in which a candidate string delimiter appears in matched pairs.

11. The computer-implemented method of claim 7, wherein the feature vectors comprise the number of columns in the parsed file.

12. The computer-implemented method of claim 7, wherein the feature vectors comprise the number of lines in the file in which one or more characters appear within a column but outside of a candidate string delimiter pair.

13. The computer-implemented method of claim 7, wherein the feature vectors comprise the number of lines in the file that are longer than a pre-determined threshold length.

14. The computer-implemented method of claim 7, wherein the feature vectors comprise the number of lines on which one or more characters appear within a column, but outside of a string delimiter pair.

15. The computer-implemented method of claim 7, wherein the feature vectors comprise (i) a first indication if the number of physical lines is equal to the number of logical lines, and (ii) a second indication if the number of physical lines is not equal to the number of logical lines.

16. The computer-implemented method of claim 7, wherein the feature vectors comprise the fraction of columns in a line that are empty, averaged over all lines in the file.

17. A computer program product comprising a computer readable storage medium having program instructions embodied therewith, the program instructions executable by a device to cause the device to:
 detect (i) one or more candidate column delimiters in a file containing tabular data and (ii) one or more candidate string delimiters in the file containing tabular data, wherein a column delimiter comprises a character that separates a first column in a table from a second column in the table, and wherein a string delimiter comprises a character that denotes alphabetical text in the file;
 evaluate the likelihood of validity of each possible candidate column delimiter-candidate string delimiter pairing among the detected candidate column delimiters and the detected candidate string delimiters, wherein said evaluating comprises applying a logistic-regression classifier to each of the possible candidate column delimiter-candidate string delimiter pairings; and
 output, to at least one user, the candidate column delimiter-candidate string delimiter pairing having the highest likelihood of validity.

18. A system comprising:
 a memory; and
 at least one processor operably coupled to the memory and configured for:
  detecting (i) one or more candidate column delimiters in a file containing tabular data and (ii) one or more candidate string delimiters in the file containing tabular data, wherein a column delimiter comprises a character that separates a first column in a table from a second column in the table, and wherein a string delimiter comprises a character that denotes alphabetical text in the file;
  evaluating the likelihood of validity of each possible candidate column delimiter-candidate string delimiter pairing among the detected candidate column delimiters and the detected candidate string delimiters, wherein said evaluating comprises applying a logistic-regression classifier to each of the possible candidate column delimiter-candidate string delimiter pairings; and
  outputting, to at least one user, the candidate column delimiter-candidate string delimiter pairing having the highest likelihood of validity.

19. A computer-implemented method, comprising:
 determining how many times each of multiple non-alphanumeric characters appears on each line in at least a portion of a file containing tabular data;
 selecting, based on said determining, (i) one or more candidate column delimiters in the at least a portion of the file and (ii) one or more candidate string delimiters in the at least a portion of the file, wherein a column delimiter comprises a character that separates a first column in a table from a second column in the table, and wherein a string delimiter comprises a character that denotes alphabetical text;
 evaluating the likelihood of validity of each possible candidate column delimiter-candidate string delimiter pairing among the detected candidate column delimiters and the detected candidate string delimiters, wherein said evaluating comprises applying a logistic-regression classifier to each of the possible candidate column delimiter-candidate string delimiter pairings; and
 outputting, to at least one user, the candidate column delimiter-candidate string delimiter pairing having the highest likelihood of validity;
 wherein the steps are carried out by at least one computing device.

20. A computer-implemented method, comprising:
 scanning a file to compute a frequency map of any non-alphanumeric characters in the file, denoting how many times each of the non-alphanumeric characters appears on each line in the file;
 selecting, as string delimiter candidates, those non-alphanumeric characters that appear an even number of times on a given line, wherein a null character is appended to a list of the string delimiter candidates, and wherein the null character represents a case wherein no character is used as a string delimiter;
 for each of the string delimiter candidates:
  (i) re-scanning the file and re-computing the frequency map, ignoring any characters that are enclosed by the string delimiter candidate, wherein if the length of a given line is greater than a specified limit, starting a new line; and
  (ii) selecting, as column delimiter candidates, those characters that appear the same number of times on a number of lines that exceeds a predetermined threshold;
 scanning the file for each of the string delimiter candidates, to:
  (a) determine a hypothetical number of columns in the file by parsing a selected line from the file using a current delimiter candidate pair;
  (b) parse all lines in the file using the current delimiter candidate pair, and computing one or more feature values that indicate that the file has been parsed correctly;
  (c) if in a training phase, write the one or more feature values to a training file, and, if the current delimiter candidate pair is the correct delimiter pair, write "1" to the training file, else write "0"; and (d) if in the scoring phase, score the one or more feature values for the current delimiter candidate pair using a logistic regression model created in the training phase; and if in the training phase, computing one or more coefficients for the logistic regression model using the training file, and, if in the scoring phase, outputting the candidate delimiter pair with the highest score as the most likely delimiter pair;

wherein the steps are carried out by at least one computing device.

\* \* \* \* \*